Figure 8:
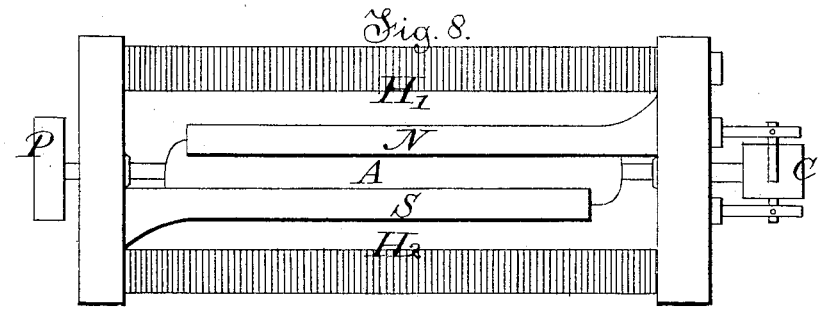

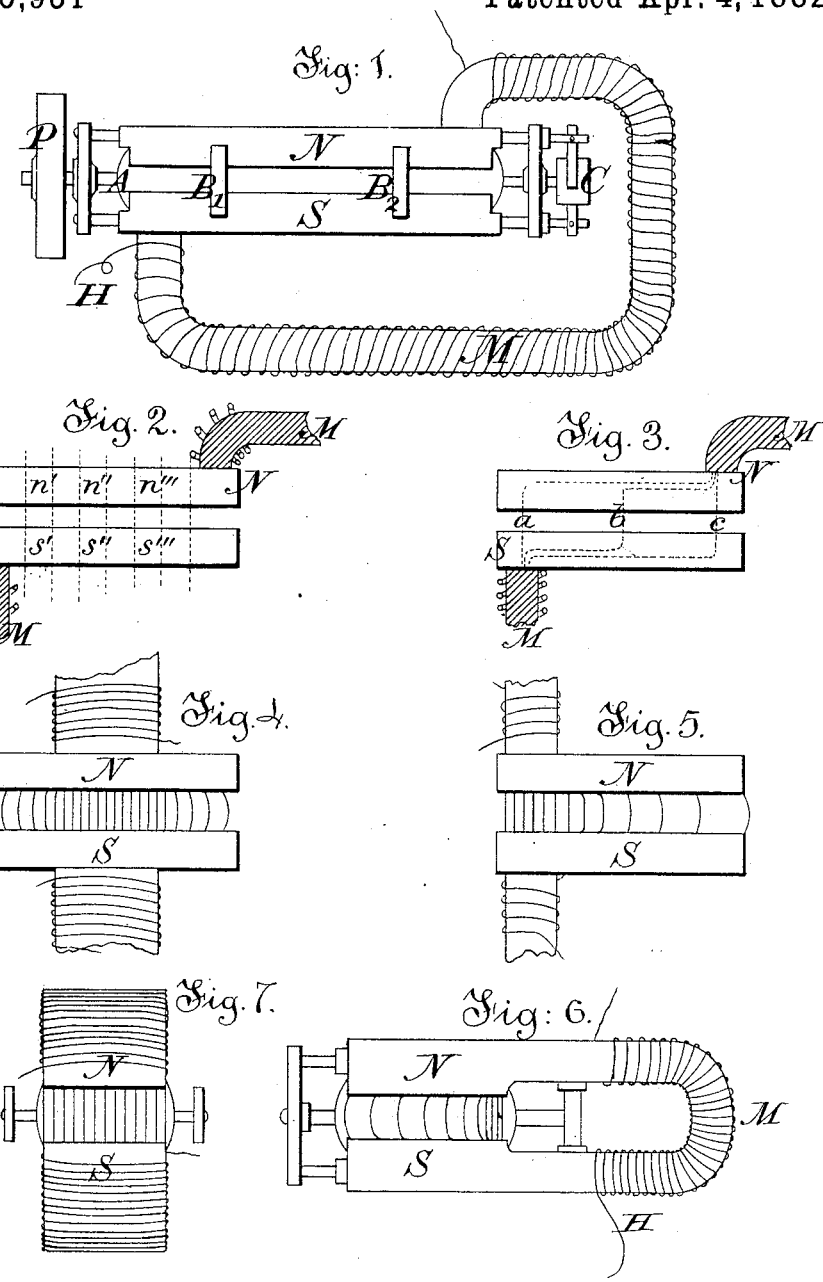

(No Model.)  2 Sheets—Sheet 2.
J. H. BUNNELL.
ELECTRIC GENERATOR AND MOTOR.

No. 255,931. Patented Apr. 4, 1882.

Witnesses:
Mr. K. Lockwood French,
Miller C. Earl

Inventor:
Jesse H. Bunnell
by his Attorney,
Frank L. Pope.

UNITED STATES PATENT OFFICE.

JESSE H. BUNNELL, OF BROOKLYN, NEW YORK.

ELECTRIC GENERATOR AND MOTOR.

SPECIFICATION forming part of Letters Patent No. 255,931, dated April 4, 1882.

Application filed August 3, 1881. (No model.)

*To all whom it may concern:*

Be it known that I, JESSE H. BUNNELL, a citizen of the United States, residing at Brooklyn, in the county of Kings and State of New York, have invented a new and useful Improvement in Electric Generators and Motors, of which improvement the following is a specification.

My invention relates to machines for transforming mechanical into electrical energy, (commonly known as "magneto-electric" or "dynamo-electric" machines, according as their magnetic fields are respectively created by permanent or electro-magnets,) as well as to machines for performing the converse operation of producing mechanical motion by means of electric currents.

It especially relates to the method of and apparatus for establishing the field of magnetic force within which the armatures of said machines revolve; and in this respect it relates more particularly to the shape and proportions of the magnet or magnets employed to create and maintain said field of force.

The object of my invention is to effect a more complete conversion of the given form of energy into the required form than has been possible in machines of this class as heretofore organized and constructed. The economic efficiency of a dynamo-electric generator is found by experience to increase in proportion as the available energy of the current produced approximates that of the producing force. In the operation of machines of this nature, however, a certain portion of the original energy is practically lost by conversion into the form of heat, a part of this heat being generated by friction in the journal-bearings of the machine, and another portion by atmospheric resistance, which is another form of friction. Furthermore, an increase of temperature, which is more or less apparent in all such machines, appears in the convolutions of the conducting-wire upon the armature and in the cores of the magnets. This increase in temperature is due to the action of electricity and magnetism upon the molecules of the metals, and the amount of heat thus generated, and consequently the loss of available energy due thereto, is found to largely depend upon the nature of the magnetic field and upon the distribution of the magnetic energy therein. By experiment I have determined that the most economical results are obtained when a certain uniformity of distribution of the magnetic force (the nature of which will be presently described at length) exists throughout the space occupied by the revolving armature of the machine. In describing and explaining this characteristic of the magnetic field, reference will be had to the accompanying drawings, in which—

Figure 9:
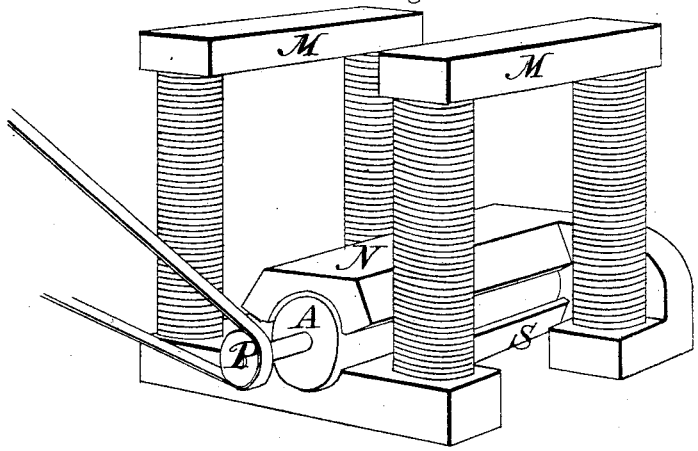
Figure 10:
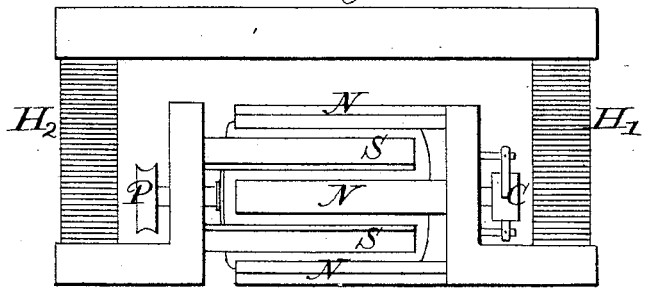

Figure 1 shows a dynamo-electric machine embodying the principles of my invention. Figs. 2 to 7, inclusive, exhibit graphically certain features of various magnetic fields respectively created by different systems of magnets. Figs. 8, 9, and 10 exhibit particular applications of my invention for practical use.

Referring to Fig. 1, the electro-magnet M is provided with two parallel polar prolongations, N S, of soft iron, having respectively concave sides facing each other, thereby forming a cylindrical chamber which is occupied by an armature, A, of similar form, preferably of the new Siemens type.

The apparatus is provided with the usual current-collecting device, C, and also with a pulley, P, by means of which a rotary motion may be communicated to the armature from any suitable source of power. The braces B' B², &c., of non-magnetic metal, serve to strengthen the apparatus and hold its parts firmly in their proper positions.

The novel feature of this machine consists in the peculiar form and arrangement of the electro-magnet M and its polar extensions N S. It will be observed that opposite ends of the respective prolongations N S are connected to the ends of the core M, carrying the helix H, which constitutes the field-magnet. The necessary result of this method of connecting the polar projections is that approximately uniform magnetic intensities throughout their entire lengths are manifested by the projections N and S, in consequence of which the attraction exerted by any cross-section, as $n'$, Fig. 2, upon its confronting section $s'$ is equal to the attraction of the section $n''$ for $s''$, of $n'''$ for $s'''$, &c. An explanation of the magnetic action which takes place in this organization is suggested in Fig. 3. The so-called "magnetic circuit," (the existence of which may be assumed for the sake of convenient explanation,) in passing from the point N to the point S, comprises an infinite number of routes, of which $a$, $b$, and $c$ are examples, all of which are obviously approximately equal in length and in resistance. In strict analogy to the laws of electrical and thermal conduction, the magnetic current may be regarded as traversing an infinite number of such circuits, and passing from one polar projection to the other across the intervening magnetic field at an infinite number of points, thereby producing a uniform distribution of magnetic force throughout the field. Hence any point on the surface of the rotating armature must necessarily traverse a field of force similar to that traversed by any other point of its length. A field possessing this particular characteristic I shall hereinafter term a "homogeneous magnetic field," in contradistinction to a field in which the intensity of the magnetic force is different at different points within it. Examples of the latter class are exhibited in Figs. 4, 5, 6, and 7, in which the relative magnetic intensity in different parts of each field is shown theoretically by the density of the shading. In a non-homogeneous magnetic field a certain section of every convolution of the conductor which surrounds the armature-core will be rotated in a region of greater intensity than the remainder, and hence the electro-motive energy will be more or less concentrated in the neighborhood of one point in each convolution, which may be termed the "active" or "current-producing" section, the remaining portion of the convolutions of the armature-conductors being active to a lesser degree, or altogether inactive, as the case may be. Moreover, it is frequently the case that the section of the soft-iron armature which revolves within the region of maximum intensity becomes magnetized to saturation, while the remaining parts are rendered but slightly magnetic. This condition of molecular strain or magnetic friction, when concentrated within a narrow section of the field of force, necessarily conduces to the development of heat, and the consequent consumption of mechanical energy, without corresponding useful effect. In this respect the action of an armature in a non-homogeneous field may be compared to the working of an axle-journal which binds or rubs at some point within its cylindrical bearing, and thereby gives rise to greater friction, and the consequent production of a greater amount of heat than would be occasioned if there were a perfectly uniform pressure upon all parts of the journal-bearing.

I am aware that homogeneous fields of limited extent have been long in use. These may be produced by certain systems of magnets, all of which may, however, be reduced to one type, which I have shown in Fig. 7; but it will be observed that in such a system the length of the armature cannot exceed the transverse breadth of the field magnet or of its pole. In order to adapt field-magnets of this form to an elongated armature, it is necessary to increase the breadth of such magnets proportionately, thereby decreasing the ratio of the breadth of the magnet to its length. This ratio, however, ought to be maintained as great as possible, as it is well known that long and narrow magnets are far more effective than those of other shapes in proportion to the strength of current by which they are polarized.

In order to secure adequate fields for elongated armatures, it has heretofore been necessary to construct such armatures of large diameter and to wind them with conductors of increased thickness. The use of such armatures in turn necessitates a wider separation of the poles of the field-magnets, thereby greatly diminishing the intensity of the magnetic field in all parts, accompanied by a corresponding loss of useful effect.

By employing forms of field-magnets similar to those which have been hereinbefore described the length of the armature may be increased in the same proportion as the ratio of the breadth to the length of the field is simultaneously increased, and this without any loss of useful effect therefrom. The use of long and narrow armatures, as well as long and narrow field-magnets, is thus rendered perfectly practicable, and I am enabled to obtain many important advantages thereby. As the diameter of the armature is decreased in proportion to its length, so is the intensity of the magnetic field increased. Moreover, the length of active current-producing conductor distributed along the armature is greater in proportion to the amount of inactive end wire. The intensity or electro-motive force of the current produced at a given speed also becomes greater as the length of the conductors upon the armature is increased. Hence I am able to attain the highly important general result of increasing the electro-motive force of the machine in proportion to its internal resistance.

I have shown in Figs. 8 and 9 respectively two forms of dynamo-electric generators constructed with magnets capable of producing the homogeneous fields hereinbefore described.

In the form shown in Fig. 8 cores of the field-magnets and the yokes which unite them at both ends constitute a closed circuit, and the respective helices $H'$ $H^2$ are so wound that both conspire to produce a north polarity throughout the prolongation N and a south polarity throughout the prolongation S. The form shown in perspective in Fig. 9 has four vertical helices, all acting unitedly in the same manner to produce the required opposite polarities in the prolongations N and S. In Fig. 10 I have shown a to-and-fro or alternating machine, the field of which is created by a number of alternating prolongations, N, S, N, S, &c., polarized by currents traversing the helices $H'$ $H^2$. These machines are presented as embodying applications of the principles hereinbefore set forth. In consequence of their essential similarity to the simple form of machine exhibited in Fig. 1, a more detailed description is deemed unnecessary.

I do not desire to confine myself to the particular forms of apparatus hereinbefore described, as it is obvious that the mechanical construction thereof may be widely varied without departing from the principles which I have set forth as of the essence of my invention.

I claim as my invention—

1. The combination, substantially as hereinbefore set forth, of a rotating armature, pole-pieces of magnetic metal lying parallel with the axis of said armature in the direction of its length, and facing each other upon opposite sides thereof, and a field-magnet having each of its magnetic poles in contact with one of said pole-pieces at points adjacent to opposite ends of said armature respectively.

2. The combination, substantially as hereinbefore set forth, of a field-magnet constituting a closed magnetic circuit, pole-pieces extending parallel to each other in opposite directions from the respective magnetic poles of said field-magnet, and a cylindrical armature mounted between said polar extensions and parallel thereto.

In testimony whereof I have hereunto subscribed my name this 30th day of July, A. D. 1881.

JESSE H. BUNNELL.

Witnesses:
J. A. HYLAND,
FRANK L. POPE.